(12) United States Patent
Momose et al.

(10) Patent No.: US 7,474,818 B2
(45) Date of Patent: Jan. 6, 2009

(54) OPTICAL SWITCH AND METHOD OF USING THE SAME

(75) Inventors: Hideto Momose, Hitachiota (JP); Yuichi Sawai, Hitachi (JP); Takashi Naito, Mito (JP); Kensuke Matsui, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 541 days.

(21) Appl. No.: 11/355,016

(22) Filed: Feb. 16, 2006

(65) Prior Publication Data

US 2006/0222834 A1    Oct. 5, 2006

(30) Foreign Application Priority Data

Mar. 30, 2005    (JP)    ............... 2005-097919

(51) Int. Cl.
*G02B 6/26* (2006.01)

(52) U.S. Cl. ............... 385/16; 385/18; 385/22

(58) Field of Classification Search ............ 385/16, 385/18, 22
See application file for complete search history.

(56) References Cited

U.S. PATENT DOCUMENTS

| | | | |
|---|---|---|---|
| 5,739,948 A | 4/1998 | Kushibiki et al. | |
| 6,790,502 B1 | 9/2004 | Yamamoto et al. | |
| 6,792,167 B2 | 9/2004 | Honda et al. | |
| 6,804,043 B2 | 10/2004 | Honda et al. | |
| 6,844,092 B2 | 1/2005 | Yamamoto et al. | |
| 6,870,983 B2 | 3/2005 | Momose et al. | |
| 6,928,206 B2 | 8/2005 | Honda et al. | |

FOREIGN PATENT DOCUMENTS

| | | |
|---|---|---|
| JP | 9-105891 | 4/1997 |
| JP | 2003-228088 | 8/2003 |
| JP | 2003-295237 | 10/2003 |
| JP | 2004-133329 | 4/2004 |
| JP | 2004-177899 | 6/2004 |

*Primary Examiner*—Frank G Font
*Assistant Examiner*—Michael P Mooney
(74) *Attorney, Agent, or Firm*—Antonelli, Terry, Stout & Kraus, LLP.

(57) ABSTRACT

An optical switch for switching signal light by allowing the signal light to obliquely enter a non-linear optical thin film 1 containing nano-crystal of metal oxide from a light path disposed in an optical material, and irradiating visible excitation light to the non-linear optical thin film to induce a total reflection phenomenon, thereby controlling the reflection and transmission behavior of the signal light, wherein a difference between a temperature coefficient factor of an optical index of the non-linear optical thin film and that of an optical index of the optical material which is in contact with the non-linear optical thin film is determined to be $15 \times 10^{-6}/°$ C. or below. Preferably, it is determined to be zero or substantially zero. Thus, an influence due to the temperature increase is cancelled, and a malfunction of switching can be avoided.

7 Claims, 6 Drawing Sheets

FIG.1

$$\frac{d(n1)}{dT} \fallingdotseq \frac{d(n2)}{dT}$$

OPTICAL SWITCH AND METHOD OF USING THE SAME

BACKGROUND OF THE INVENTION

1. Field of the Invention

The present invention relates to an optical switch for switching light paths in optical communication and a method of using the same.

2. Description of the Related Art

There is proposed an optical switch which uses a non-linear optical thin film and utilizes a total reflection phenomenon involved in a change in optical index of the non-linear optical thin film due to excitation light. Japanese Patent Laid-Open Publication No. 2003-228088 discloses an optical switch of a type which obliquely enters signal light to a non-linear optical thin film by using a waveguide and switches a destination of the signal light to a transmitted light side or a reflected light side by irradiating excitation light.

In a case where the optical switch of the type described above is used, the total reflection phenomenon occurs under the following conditions. Specifically, it is assumed that an optical index of an optical material (including a waveguide) in front or back of a thin film material is n1 and an optical index of a thin film is n2. And, when it is assumed that an incidence angle from the optical material (including a waveguide) in front or back of the non-linear optical thin film material to the non-linear optical thin film material is θ1, a refraction angle θ2 in the non-linear optical thin film is expressed by the following equation (1).

$$\theta 2 = a\sin^{-1}\{(n1/n2)\sin\theta 1\} \quad (1)$$

To reduce a reflection loss at the time of no excitation, an optical design is made under a condition of n1/n2, so that θ1≈θ2 at the time of no excitation, but the relation becomes θ2>θ1 because the optical index n2 of the non-linear optical thin film lowers at the time of excitation. Here, when the ratio of n2 and n1 is in a region smaller than the condition of the following equation (2), a total reflection phenomenon is caused.

$$(n2/n1) = \sin\theta 1 \quad (2)$$

For example, total reflection occurs when (n2/n1) is 0.86 or less if θ1=60°, (n2/n1) is 0.974 or less if θ1=77°, or (n2/n1) is 0.999 or less if θ1=88°. In other words, a change in optical index for the total reflection can be made smaller by increasing an incidence angle to the non-linear optical thin film.

Japanese Patent Laid-Open Publications No. 2003-228088 and No. 2004-133329 disclose an optical switch using a non-linear optical thin film that the optical index n2 is changed by 2% or more at a very high speed of 10 nanoseconds. And, the Publication No. 2004-133329 describes that the non-linear optical thin film is formed of fine particles having a particle diameter of 25 nm or less.

In the case of the above-described optical switch, the visible light for excitation is partly absorbed by the non-linear optical thin film and converted to heat. Where the excitation light is intermittently irradiated, it is scattered and cooled down by heat transmission or the like while it is not being irradiated. But, when the above-described optical switch is used under a condition that excitation is continued for a long time, the temperature of the non-linear optical thin film increases gradually, and a change in optical index due to the temperature change overlaps. The temperature change induces a change in polarizability of the non-linear optical thin film, thereby increasing the optical index. A temperature coefficient factor of an optical index of a glass material is expressed by the following equation (3) in a paper in Physical Chemistry of Glasses Vol. 1 (1960) pp 119, or the like.

$$dn/dT = \{(n^2-1)(n^2+2)/6n\} \times \{(1/P)\cdot(dP/dT) - 3\alpha\} \quad (3)$$

In the equation, n is an optical index, P is a molar polarizability, and α is a thermal expansion coefficient. In other words, it means that a change in polarizability and a density drop due to thermal expansion give opposite effects on the temperature dependency of the optical index. Here, an oxide material such as $Fe_2O_3$, which is used for the above-described optical switch and shows a non-linear optical effect, surpasses in a polarizability effect, and dn/dT has a positive value.

There is also proposed a heat-modulation-type optical switch in that a change in optical index due to heat is used for switching. For example, Japanese Patent Laid-Open Publication No. Hei 9-105891 discloses an optical index modulation element using poly-siloxane of which optical index lowers when heated. The disclosed temperature coefficient factor of the optical index is negatively large to be $-1000\times10^{-6}$ to $-50\times10^{-6}/°C$. But, a change in optical index due to heating and cooling has a slow response speed in order of msec in comparison with a change in optical index caused by light excitation. Switching of this material at a response speed of msec or below due to a change in optical index is difficult.

An object of the invention is to avoid a malfunction of a total reflection type optical switch under excitation conditions for a long time.

SUMMARY OF THE INVENTION

To remedy the above problems, a first aspect of the present invention provides an optical switch structure and a material design in that a temperature coefficient factor of a threshold value (n2/n1) indicated by the equation (2) becomes small. Specifically, there is proposed a combination of a non-linear optical thin film and an optical material which is in contact with it, both having an equal temperature coefficient factor of an optical index. As a second aspect, there are proposed an optical switch structure that can be used under a condition that a temperature change of the threshold value (n2/n1) indicated by the equation (2) is small, and an operation method. Besides, as a third aspect, there is proposed an optical switch structure in that a temperature change is reduced, and a change in (n2/n1) represented by the equation (2) is decreased.

DETAILED DESCRIPTION OF THE INVENTION

According to the present invention, it has become possible to avoid a malfunction of an optical switch under excitation conditions for a long time, which excites a non-linear optical thin film by visible excitation light and changes an optical index to switch light paths. Thus, the reliability of the optical switch is improved, and it has become possible to use it under the excitation conditions for a longer period.

A first means of the invention is realized by an optical switch for switching signal light by allowing the signal light to obliquely enter a non-linear optical thin film from a light path disposed in an optical material, and irradiating visible excitation light to the non-linear optical thin film to induce a total reflection phenomenon, thereby controlling the reflection and transmission behavior of the signal light, wherein a difference between a temperature coefficient factor of an optical index of the non-linear optical thin film and that of an optical index of the optical material in contact with the non-linear optical thin film is determined to be small. The difference in temperature coefficient factor of the optical index is desirably determined to be $15 \times 10^{-6}$/° C. or less, and more desirably zero or substantially zero.

As a more specific means, it is realized by using a material having a positive thermal expansion coefficient for the non-linear optical thin film and a material having a negative value of the thermal expansion coefficient for the optical material which is in contact with the non-linear optical thin film. It is desirable in view of a principle of operation of the optical switch that the optical material which does not absorb the excitation light is used for the optical material including the light path, and the optical material which absorbs the excitation light is used for the non-linear optical thin film in view of an energy loss and in view of suppression of a temperature increase of the switch element as a whole. An influence of a change in optical index due to a change in polarizability becomes larger in the non-linear thin film which is largely influenced by absorption at an excitation light wavelength and abnormal dispersion of an optical index which is incidentally formed by it than in the optical material which includes a light path not having absorption at an excitation light wavelength. Therefore, in view of the above-described equation (3), it is necessary to adjust in a term of a thermal expansion coefficient to combine a temperature coefficient factor of an optical index of an optical material including a light path and that of a non-linear optical thin film, and it is realized by using a material having a positive thermal expansion coefficient for the latter and a material having a negative thermal expansion coefficient for the former. A material having a negative thermal expansion coefficient is, for example, $ZrW_2O_8$.

As another means, it can be achieved by forming a hybrid of a non-linear optical thin film which has a temperature coefficient factor of an optical index large in positive and an optical material which has an optical index large in negative in order of nanometer and adjusting the optical index and the temperature coefficient factor of the optical index. As means for providing a hybrid, there are a method of alternately laminating them in thickness smaller than a wavelength of light used as signal light and a method of dispersing fine particles of metal oxide configuring a thin film showing non-linear optical properties into an optical material having a temperature coefficient factor of a negative optical index. For example, poly-siloxane disclosed in the above-described Japanese Patent Laid-Open Publication No. Hei 9-105891 has a slurry of a material resin hardened at 80° C. to obtain an optical index of 1.4319 (at 587.6 nm) and a temperature coefficient factor of $-320 \times 10^{-6}$/° C. of an optical index. The above-described non-linear optical thin film can be produced by using the above materials. The hybrid non-linear optical thin film has an optical index and a temperature coefficient factor of the optical index which are between those of a non-linear optical thin film material (e.g., $Fe_2O_3$) which is an original material and an optical material (e.g., poly-siloxane) having the temperature dependency of the optical index which is large in negative, and their values can be adjusted by a mixing ratio. As a course of action, the optical index and the temperature coefficient factor of the optical index are conformed to the optical material for forming the light path. What is described above is a specific method of the first means.

A second means will be described below. A temperature difference from the surrounding becomes large as the temperature near the non-linear optical thin film due to continuous excitation rises, a heat flow also increases in proportion to the temperature difference, and a temperature increase stops when it becomes substantially equal to an input energy amount. Accordingly, a cooling fin and a heater are disposed on the switch element, and a feedback control of the heater strength is performed so as to keep the element temperature at a temperature which can be reached by a maximum applied energy under the use conditions. In other words, the element temperature is kept at a constant level by reducing an electric current amount supplied to the heater in a case where excitation light is irradiated at a high frequency, and increasing the electric current amount supplied to the heater in a case where the excitation light is irradiated at a low frequency. Thus, a characteristic change due to the temperature change is suppressed, and the object of the invention is achieved.

A third aspect is realized by combining an optical switch which has a slow response speed but a less loss and mechanically switches light paths and an optical switch which operates at a high speed and uses the above-described non-linear optical thin film. Specifically, signal light and excitation light are alternately switched to plural optical switches using a non-linear optical thin film by a mechanical switch. Thus, there is provided an optical switch structure in that the individual optical switches using the non-linear optical thin film are intermittently excited, so that it becomes possible to secure the cooling time, the maximum value of a temperature change is reduced, and a change in (n2/n1) expressed by the equation (2) is decreased.

According to the present invention, the non-linear optical thin film is desirably formed of fine particles having a particle diameter of 25 nm or less.

Figure 2:
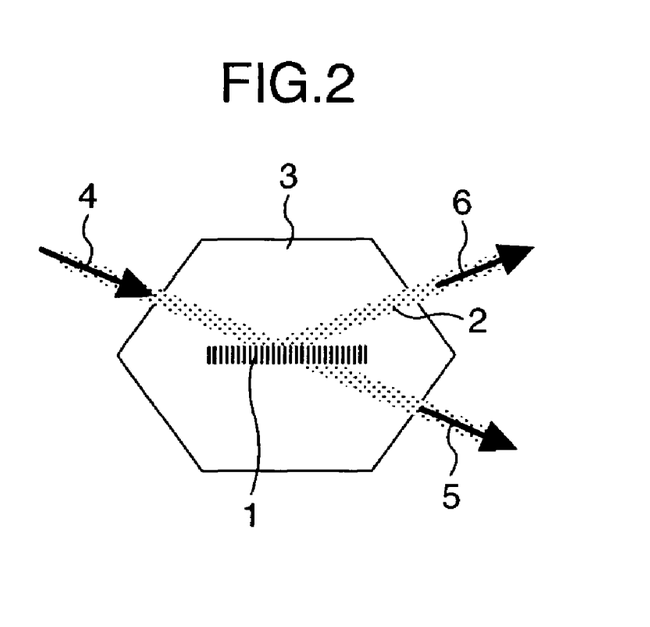
FIG. 2 is a schematic view showing an example of an optical switch utilizing total reflection.
Figure 3A:
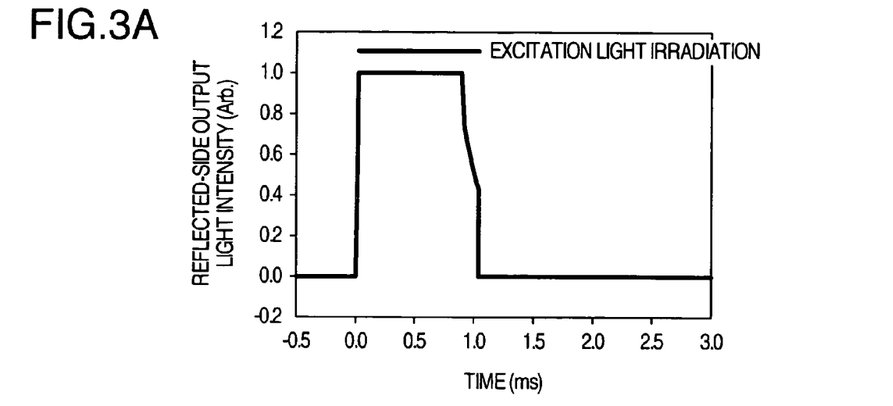
FIG. 3A is a characteristic view showing a change in output light intensity (at an incidence angle of 77°) on a reflected side at the time of excitation.
Figure 3B:
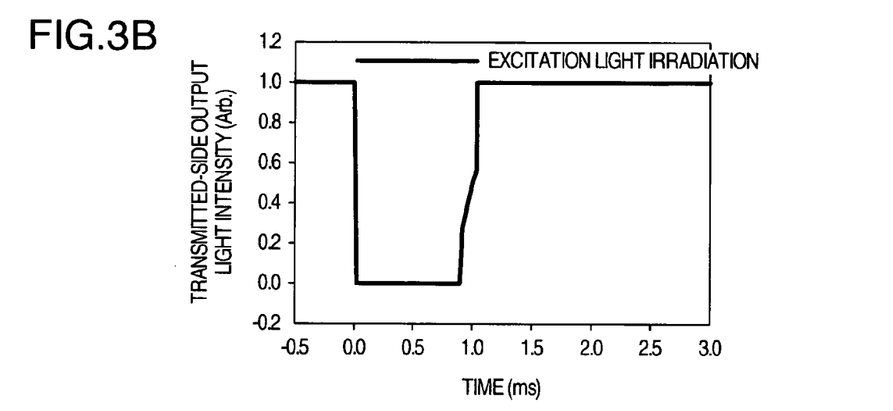
FIG. 3B is a characteristic view showing a change in output light intensity (at an incidence angle of 77°) on a transmitted side.
Figure 4:
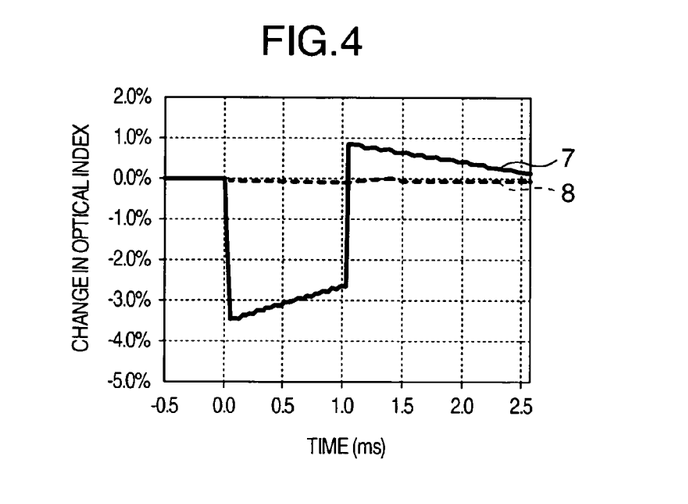
FIG. 4 is a characteristic view showing a change in optical index at the time of excitation.

As shown in FIG. 2, the present inventor used a total reflection type optical switch, which had a waveguide 2 formed of $TiO_2$ and having an optical index of 2.4 connected to a non-linear optical thin film 1 containing $Fe_2O_3$ and having an optical index of 2.4 at an incidence angle of 77°, multiplexed as incident light 4 signal light having a wavelength of 1550 nm and excitation light having a wavelength of 780 nm by means of an optical coupler to irradiate it, and checked the responses of transmitted-side output light 5 and reflected-side output light 6 by measuring a signal light intensity after the passage through a filter for shutting out the excitation light. Response characteristics of the reflected-side output light and the transmitted-side output light with the excitation time determined to be continuously 1 msec are shown in FIG. 3A and FIG. 3B. There is no reflection on the surface of the non-linear optical thin film prior to the irradiation of the excitation light, and substantially 100% of the output light is taken from the transmitted side. Besides, when the irradiation of the excitation light is started, the optical index n2 of the non-linear optical thin film drops to (n2/n1) or less which is expressed by the equation (2) to cause a total reflection phenomenon, and substantially 100% of the output light is taken from the reflected side. But, after a lapse of approximately 0.9 msec, the reflected-side output light starts to lower, and the transmitted-side output light starts to increase. FIG. 4 shows time changes of an optical index 7 of the non-linear optical thin film and an optical index 8 of the waveguide at that time. It is seen that the optical index drops quickly together with the irradiation of the excitation light. Then, when the irradiation time becomes long, the excitation energy is converted to heat and accumulated, and the temperatures of the non-linear optical thin film and the waveguide facing it increase gradually. At this time, the temperature dependency of the optical index is $80 \times 10^{-6}/°$ C., which is larger than $-0.6 \times 10^{-6}/°$ C. of the waveguide. Therefore, it is considered that the value of (n2/n1) becomes large substantially, which is larger than the numerical value required for the total reflection specified by the equation (2), and the total reflection condition is disrupted. The optical index overshoots even after stopping the excitation light because of the influence of the accumulated heat, and a state higher than that before the excitation remains for a while until heat is radiated by thermal diffusion.

Figure 5A:
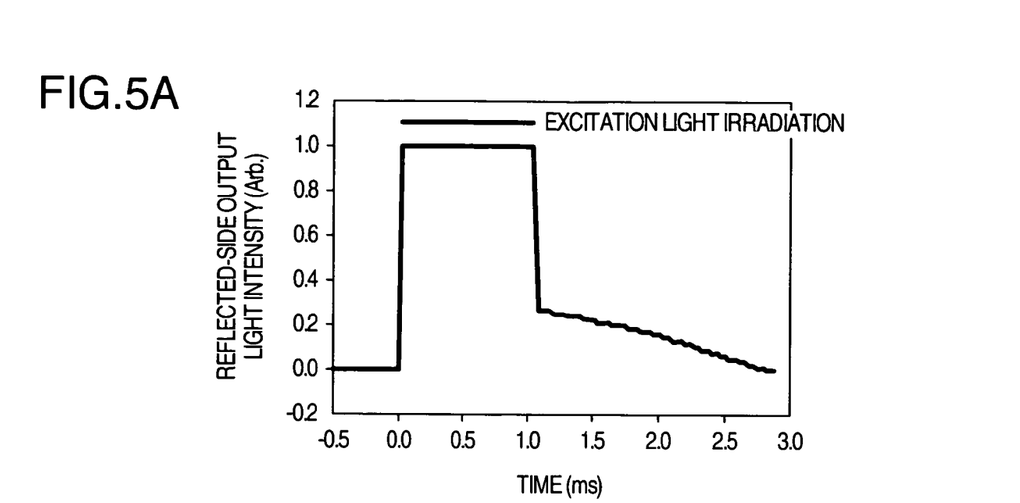
FIG. 5A is a characteristic view showing a change in output light intensity (at an incidence angle of 88°) on a reflected side at the time of excitation.
Figure 5B:
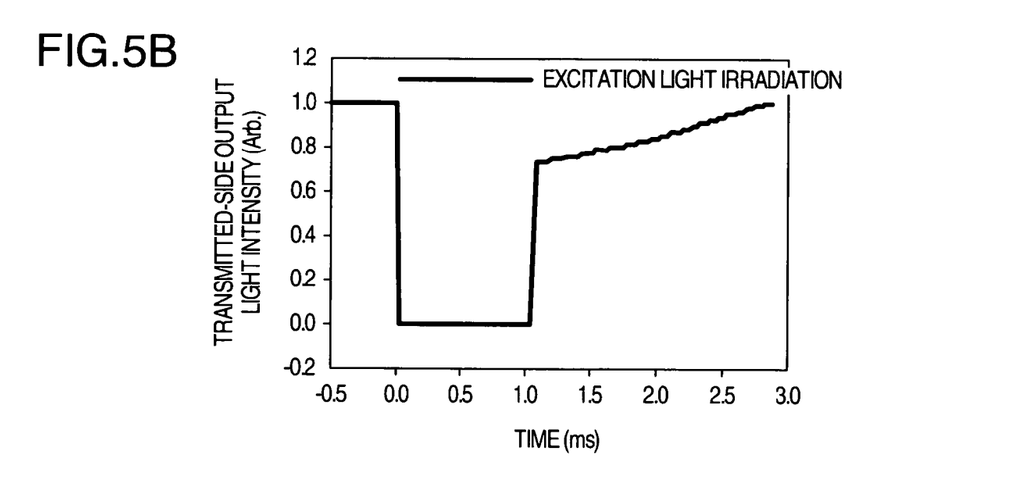
FIG. 5B is a characteristic view showing a change in output light intensity (at an incidence angle of 88°) on a transmitted side.

Here, the results of increasing the incidence angle θ1 from the waveguide to the non-linear optical thin film in order to increase the threshold (n2/n1) with which the total reflection occurs so that the total reflection conditions are not disrupted during the excitation will be described. FIG. 5A and FIG. 5B show response characteristics of the reflected-side output light and the transmitted-side output light resulting from the same study conducted at an incidence angle of 88°. The total reflection conditions were not disrupted during the excitation, but there was a phenomenon of no complete return on the reflected side and the transmitted side immediately after the termination of the excitation due to an influence of the overshoot of the optical index because of the heat accumulation. In the above-described example, the waveguide was used as the light path for the signal light and the excitation light, but there is the same situation even when a light path of a light collecting optical system is disposed in a one-body optical material.

As described above, in the case where the total reflection type optical switch has an increased temperature when used under the conditions for long-period excitation, the switching operation is affected by the temperature dependency of the optical index, and there is a possibility of a malfunction. Therefore, it is required to take measures against it. Means for avoidance of a malfunction of the switch will be described below.

EXAMPLE 1

Figure 1:
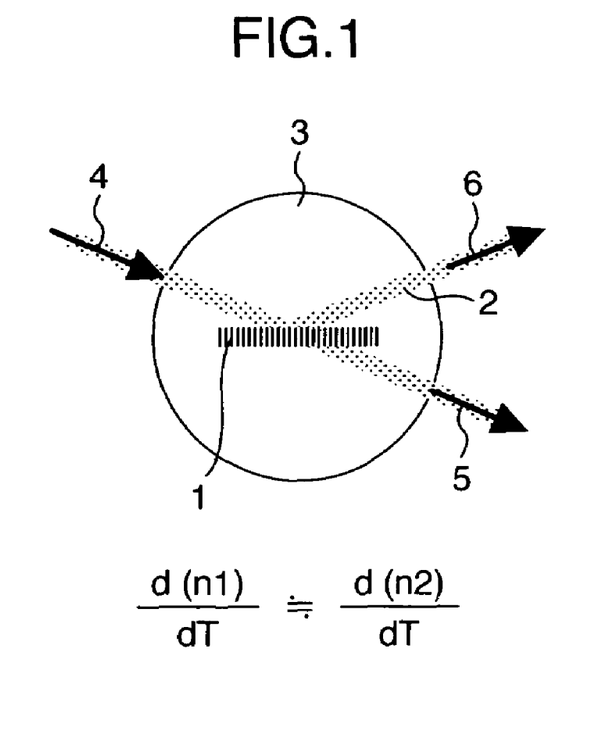
FIG. 1 is a schematic view showing a structure of an optical switch according to the invention.
Figure 6A:
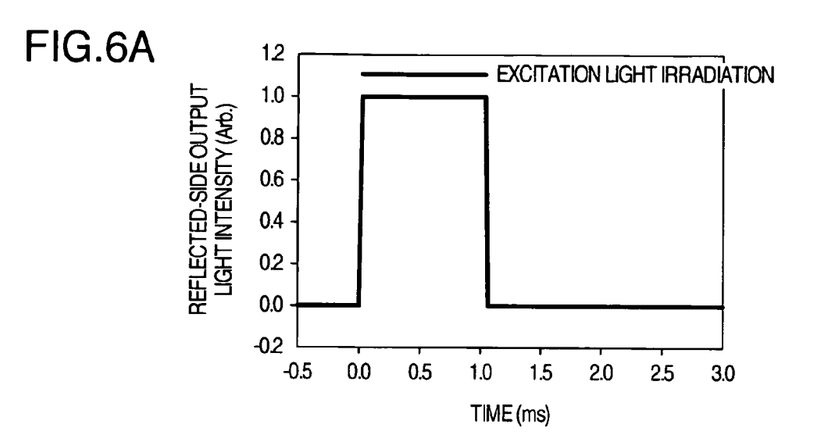
FIG. 6A is a characteristic view showing a change in output light intensity (at an incidence angle of 77°) on a reflected side at the time of excitation in Example 1.
Figure 6B:
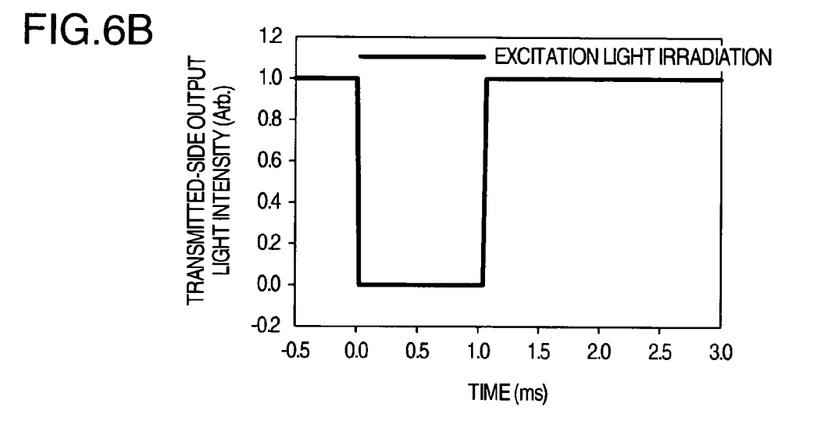
FIG. 6B is a characteristic view showing a change in output light intensity (at an incidence angle of 77°) on a transmitted side.
Figure 7:
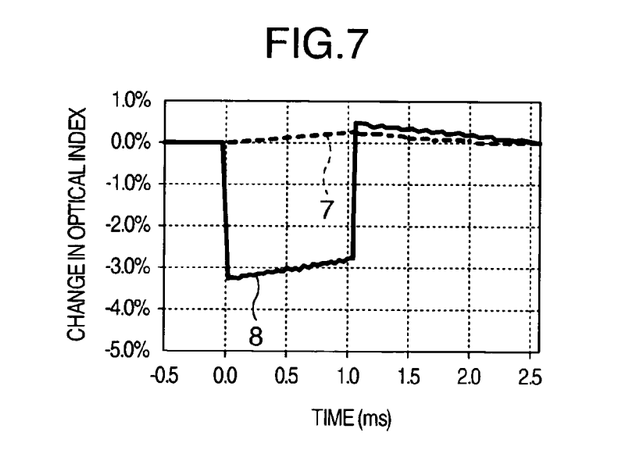
FIG. 7 is a characteristic view showing a change in optical index at the time of excitation in Example 1.

FIG. 1 is an explanatory view of an optical switch of the invention. The incident light 4 was allowed to obliquely enter the non-linear optical thin film 1 containing nano-crystal of metal oxide through the light path (waveguide) 2 disposed in an optical material 3, and visible excitation light was irradiated to the same spot on the non-linear optical thin film to induce a total reflection phenomenon so as to control the reflection and transmission behavior of signal light to make switching of the signal light. In this example, the excitation light was multiplexed with the signal light by means of a fiber coupler and irradiated. The excitation light may be irradiated to a signal light spot on the non-linear optical thin film from a side, namely from a direction perpendicular to the sheet of FIG. 1. $ZrW_2O_8$ having a thermal expansion coefficient of $-10 \times 10^{-6}/°$ C. was used as a waveguide. The temperature coefficient factor of the optical index was estimated to be $30 \times 10^{-6}/°$ C. Meanwhile, as a non-linear optical thin film, a sputtered film having $SiO_2$ added to $Fe_2O_3$ was formed in a groove disposed in the waveguide. A ratio of $SiO_2$ was adjusted in compliance with the optical index of $ZrW_2O_8$. The temperature coefficient factor of the optical index was estimated to be $45 \times 10^{-6}/°$ C. A difference between the temperature coefficient factor of the optical index of the non-linear optical thin film and that of the optical index of the optical material was $15 \times 10^{-6}/°$ C. With the above combination, the responses of the reflected-side and transmitted-side output light at the time of excitation under the same conditions as those in FIG. 2 and FIGS. 3A, 3B were studied, and the results shown in FIG. 6A and FIG. 6B were obtained. And, the change in optical index is shown in FIG. 7. Because the non-linear optical thin film and the optical material change in synchronization with each other, a change in the threshold value of (n2/n1) of the equation (2) is suppressed to be small, so that the deviations from the total reflection conditions seen in FIGS. 3A, 3B are not observed in FIG. 6, and it was confirmed that a malfunction hardly occurred by performing the excitation for a long time.

EXAMPLE 2

Figure 8:
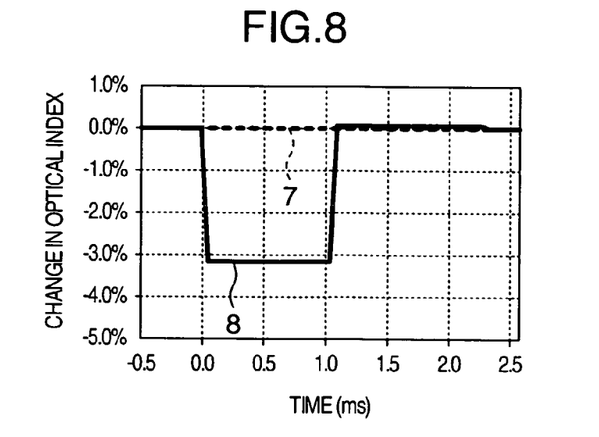
FIG. 8 is a characteristic view showing a change in optical index at the time of excitation in Example 2.

The same waveguide as in FIG. 2 was used, and as a non-linear optical thin film, an $Fe_2O_3$ thin film and a thin film of polysilazane having an optical index of 1.4319 (at 587.6 nm) and a temperature coefficient factor of $-320 \times 10^{-6}/°$ C. of an optical index and having thickness of 80 nm and 20 nm respectively were alternately laminated to obtain a transmission optical index of 2.4. And, the temperature coefficient factor of the optical index became substantially zero. A change in optical index obtained at that time is shown in FIG. 8. It was confirmed by the evaluation of the same response characteristic as in FIGS. 3A, 3B that no deviation from the total reflection condition was observed similar to FIGS. 6A, 6B, and a malfunction did not occur easily even by the excitation performed for a long time. In this example, a difference between a temperature coefficient factor of an optical index of the non-linear optical thin film and that of an optical index of the optical material is $0.6 \times 10^{-6}/°$ C.

EXAMPLE 3

Figure 9:
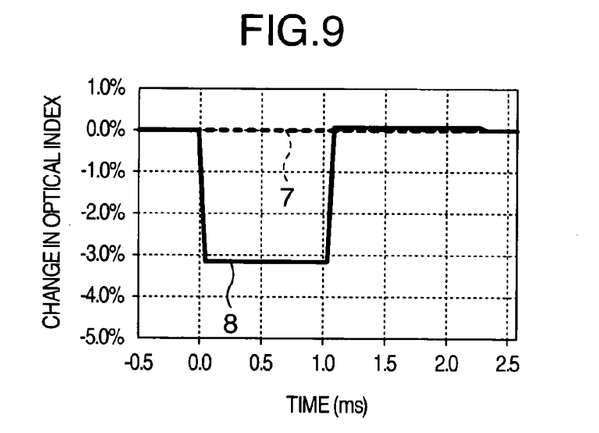
FIG. 9 is a characteristic view showing a change in optical index at the time of excitation in Example 3.

The same waveguide was used as in FIG. 2, and as a non-linear optical thin film, dozen-nanometer nanoparticles of $Fe_2O_3$ and a resin material of polysilazane having an optical index of 1.4319 (at 587.6 nm) and a temperature coefficient factor of $-320 \times 10^{-6}/°$ C. of an optical index were dispersed and mixed such that a volume ratio of $Fe_2O_3$ became 80% after curing, and cured by heating at 80° C. to obtain a transmission optical index of 2.4. In this case, the temperature coefficient factor of the optical index also became substantially zero. A change in optical index is shown in FIG. 9. It was confirmed by the evaluation of response characteristics of the reflected light and the transmitted light that no deviation from the total reflection condition was observed similar to FIGS. 6A, 6B, and a malfunction did not occur easily even by the excitation performed for a long time. In this example, a difference between a temperature coefficient factor of an optical index of the non-linear optical thin film and that of an optical index of the optical material is $0.6 \times 10^{-6}/°$ C.

EXAMPLE 4

Figure 10:
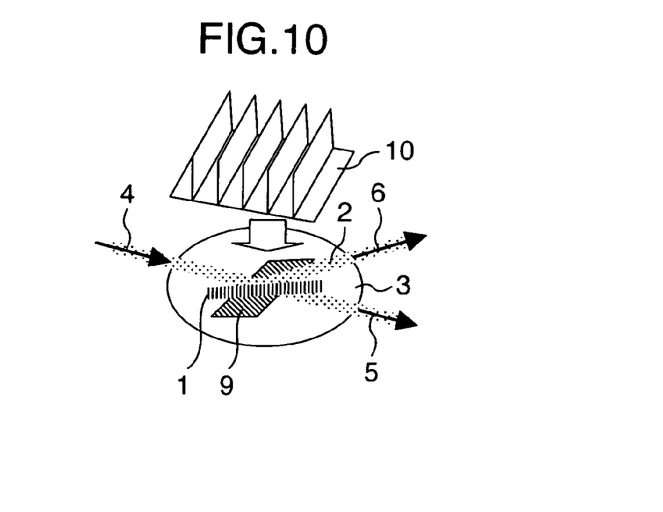
FIG. 10 is a schematic view showing an optical switch element structure of Example 4.
Figure 11:
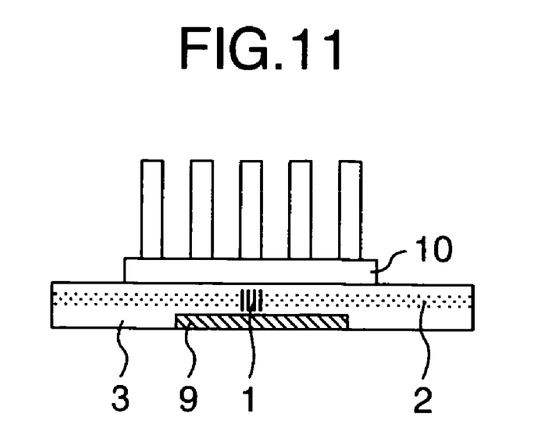
FIG. 11 is a side view of the optical switch element of Example 4.

As shown in FIG. 10, a heater 9 is disposed below the non-linear optical thin film 1, and a fin 10 is disposed on the opposite side. A side view is shown in FIG. 11. Electric current of A×(M−X) (where, A and M are constant) is passed through the heater in conjunction with irradiation time X per unit time of the excitation light. Here, M is a maximum irradiation time under the use conditions, and A is a current amount for making the heater to generate the same energy as an energy amount to be absorbed by the element at that time. Thus, the energy to be input per unit time to the periphery of the non-linear optical thin film becomes constant and reaches a thermally equilibrium state after a lapse of a prescribed period. And, a change in optical switching characteristic due to the temperature dependency of the optical index is substantially eliminated. Incidentally, energy saving can be made by appropriately reviewing the maximum irradiation time M per unit time. And, judgment whether or not thermal equilibrium has been reached may be confirmed by a sensor which is disposes within the element or may be judged from an operation of the optical switch at the time when the excitation light which provides a detail resistance value or a threshold value of the heater is input on a trial basis.

EXAMPLE 5

Figure 12:
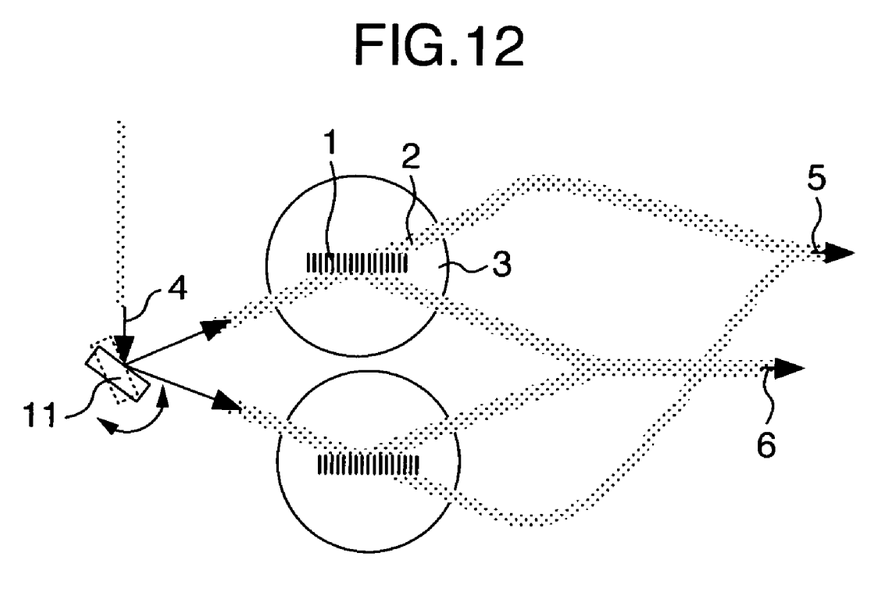
FIG. 12 is a schematic view showing a structure of an optical switch of Example 5.

As shown in FIG. 12, the destinations of the incident light 4 having signal light and excitation light multiplexed are periodically switched by a mirror 11, which is disposed such that input is made alternately to two high-speed optical switches having a non-linear optical thin film. Because the two switches are alternately used, the input energy per time becomes half or less including a dead time for switching, and it becomes possible to suppress the temperature increase low. In this example, the two high-speed optical switches are connected, but it should to be noted that the influence of the temperature increase can be decreased by connecting and switching a larger number of high-speed optical switches.

In Examples 1 through 5, the optical switches having a basic structure of 1×2 were described, but it should be noted that it is also possible to provide m×m switches.

The invention claimed is:

1. An optical switch for switching signal light by allowing the signal light to obliquely enter a non-linear optical thin film containing nano-crystal of a metal oxide from a light path disposed in an optical material, and irradiating visible excitation light to the non-linear optical thin film to induce a total reflection phenomenon, thereby controlling the reflection and transmission behavior of the signal light, wherein
a difference between a temperature coefficient factor of an optical index of the non-linear optical thin film and that of an optical index of the optical material which is in contact with the non-linear optical thin film is determined to be $15 \times 10^{-6}/°$ C. or below.

2. An optical switch for switching signal light by allowing the signal light to obliquely enter a non-linear optical thin film containing nano-crystal of a metal oxide from a light path disposed in an optical material, and irradiating visible excitation light to the non-linear optical thin film to induce a total reflection phenomenon, thereby controlling the reflection and transmission behavior of the signal light, wherein
the non-linear optical thin film is formed of a material having a thermal expansion coefficient in a positive value, and the optical material in contact with the non-linear optical thin film is formed of a material having a thermal expansion coefficient in a negative value.

3. An optical switch for switching by allowing signal light to obliquely enter from a light path disposed in an optical material into a non-linear optical thin film, and irradiating visible excitation light to the non-linear optical thin film to induce a total reflection phenomenon, thereby controlling the reflection and transmission behavior of the signal light, wherein
the non-linear optical thin film is formed of a multilayer which is comprised of a film having a temperature coefficient factor of a positive optical index and a film having a temperature coefficient factor of a negative optical index.

4. An optical switch for switching by allowing signal light to obliquely enter from a light path disposed in an optical material into a non-linear optical thin film, and irradiating visible excitation light to the non-linear optical thin film to induce a total reflection phenomenon, thereby controlling the reflection and transmission behavior of the signal light, wherein
the non-linear optical thin film is formed of a composite material of metal oxide particles and an organic material having a temperature coefficient factor of a negative optical index.

5. An optical switch for switching signal light by allowing the signal light to obliquely enter from a light path disposed in an optical material into a non-linear optical thin film, and irradiating visible excitation light to the non-linear optical thin film to induce a total reflection phenomenon, thereby controlling the reflection and transmission behavior of the signal light, wherein
a temperature of the non-linear optical thin film is kept at a temperature of a maximum frequency excitation light emitting condition.

6. The optical switch according to claim 5, wherein
it is controlled to increase an amount of heat applied when an excitation frequency is low and to decrease the amount of heat applied when the excitation frequency is high by means of a heating device disposed near the non-linear optical thin film such that the temperature of the non-linear optical thin film can be kept at the temperature of the maximum frequency excitation light emitting condition.

7. A method of using an optical switch, comprising:
disposing plural sets of optical switches for switching signal light by allowing the signal light to obliquely enter from a light path disposed in an optical material into a non-linear optical thin film, and irradiating visible excitation light to the non-linear optical thin film to induce a total reflection phenomenon, thereby controlling the reflection and transmission behavior of the signal light; and
alternately using intermittently the plural sets of optical switches by means of a lower-speed optical switch than the plural sets of optical switches.

* * * * *